US007720078B2

(12) United States Patent
Küchenhoff

(10) Patent No.: US 7,720,078 B2
(45) Date of Patent: May 18, 2010

(54) INDIVIDUAL SENDING OF MESSAGES TO PACKET NETWORK SUBSCRIBERS

(75) Inventor: Stefan Küchenhoff, Oberhaching (DE)

(73) Assignee: Siemens Aktiengesellschaft, Munich (DE)

( * ) Notice: Subject to any disclaimer, the term of this patent is extended or adjusted under 35 U.S.C. 154(b) by 627 days.

(21) Appl. No.: 11/578,466

(22) PCT Filed: Apr. 1, 2005

(86) PCT No.: PCT/EP2005/051486

§ 371 (c)(1),
(2), (4) Date: Oct. 13, 2006

(87) PCT Pub. No.: WO2005/101783

PCT Pub. Date: Oct. 27, 2005

(65) Prior Publication Data

US 2007/0211733 A1    Sep. 13, 2007

(30) Foreign Application Priority Data

Apr. 14, 2004   (EP) ................................ 04008884

(51) Int. Cl.
*H04L 29/06* (2006.01)
(52) U.S. Cl. ................. 370/400; 370/351; 370/401
(58) Field of Classification Search ............... 370/400, 370/401, 257, 352, 351, 433, 338, 354; 455/456; 709/220

See application file for complete search history.

(56) References Cited

U.S. PATENT DOCUMENTS

| | | | | |
|---|---|---|---|---|
| 5,596,723 A | * | 1/1997 | Romohr | 709/222 |
| 5,634,011 A | * | 5/1997 | Auerbach et al. | 709/242 |
| 5,948,055 A | * | 9/1999 | Pulsipher et al. | 709/202 |
| 5,964,837 A | * | 10/1999 | Chao et al. | 709/224 |
| 6,028,848 A | * | 2/2000 | Bhatia et al. | 370/257 |
| 6,243,746 B1 | * | 6/2001 | Sondur et al. | 709/220 |
| 6,292,539 B1 | * | 9/2001 | Eichen et al. | 379/1.04 |
| 6,654,796 B1 | | 11/2003 | Slater et al. | |
| 6,731,621 B1 | * | 5/2004 | Mizutani et al. | 370/338 |
| 6,778,525 B1 | * | 8/2004 | Baum et al. | 370/351 |
| 6,883,024 B2 | * | 4/2005 | Ullmann | 709/220 |
| 7,062,279 B2 | * | 6/2006 | Cedervall et al. | 455/456.3 |
| 7,337,184 B1 | * | 2/2008 | Or et al. | 707/102 |
| 7,340,507 B2 | * | 3/2008 | Tuunanen et al. | 709/219 |
| 7,369,540 B1 | * | 5/2008 | Giroti | 370/352 |
| 7,382,789 B2 | * | 6/2008 | Yu | 370/401 |
| 7,386,000 B2 | * | 6/2008 | Lopponen et al. | 370/433 |
| 7,574,738 B2 | * | 8/2009 | Daude et al. | 726/15 |
| 2002/0159442 A1 | * | 10/2002 | Quigley et al. | 370/352 |
| 2003/0112808 A1 | * | 6/2003 | Solomon | 370/400 |
| 2003/0154306 A1 | | 8/2003 | Perry | |

FOREIGN PATENT DOCUMENTS

WO           9613108 A2   5/1996
WO    WO 02/073921 A2    9/2002

* cited by examiner

*Primary Examiner*—Thong H Vu

(57) ABSTRACT

In one aspect, a method in a packet-switched network for accessing a first subscriber is provided. A control server receives a message intended for the first subscriber of the packet-switched network. The control server inquires a topology database for information of how to reach the first subscriber according to the topology of the packet-switched network. A response having a topological path description is received by the control server. The message is transmitted to the first subscriber in accordance with the received topological path. Whereby, the first subscriber is assessable via a plurality of control servers in the packet-switched network.

10 Claims, 2 Drawing Sheets

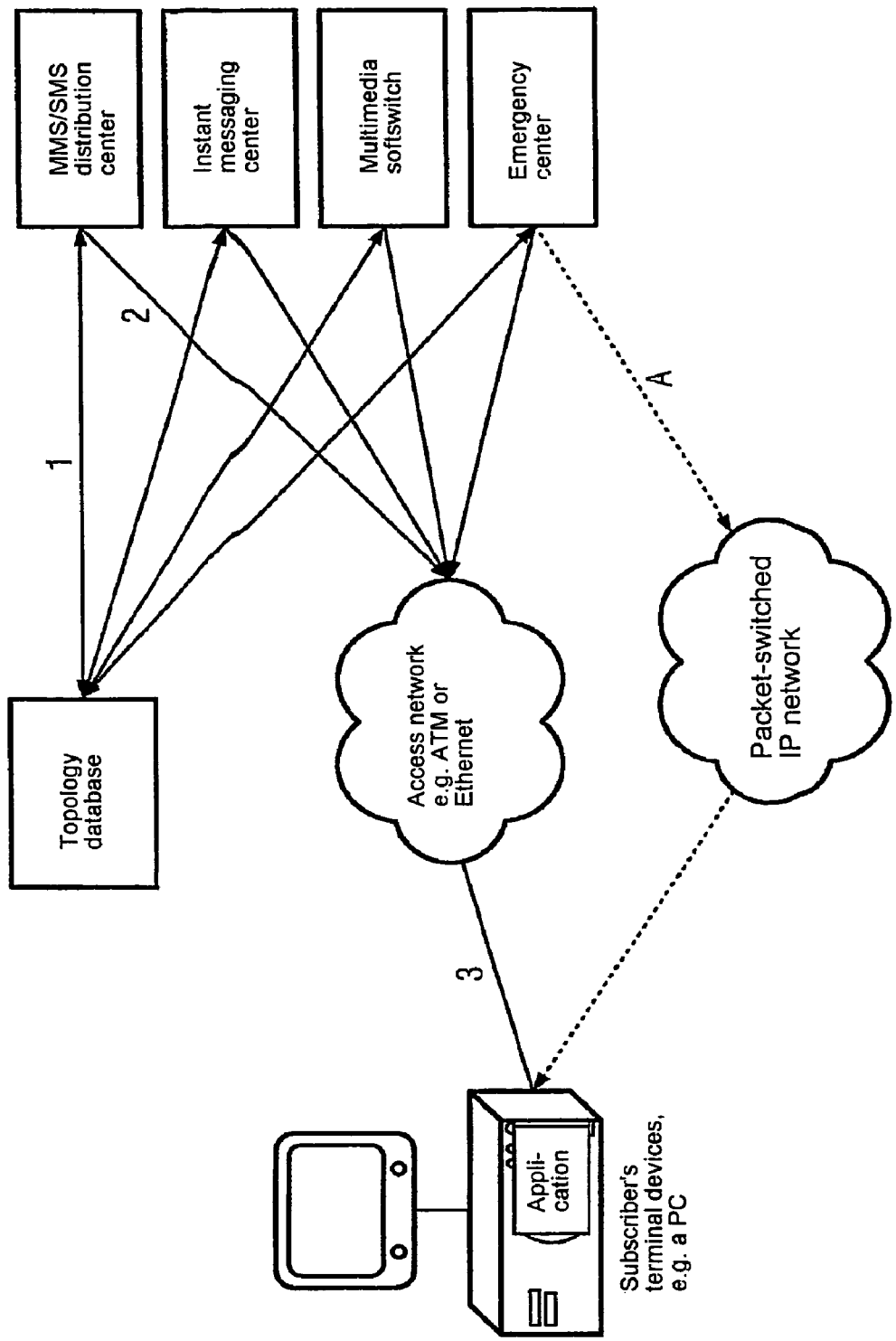

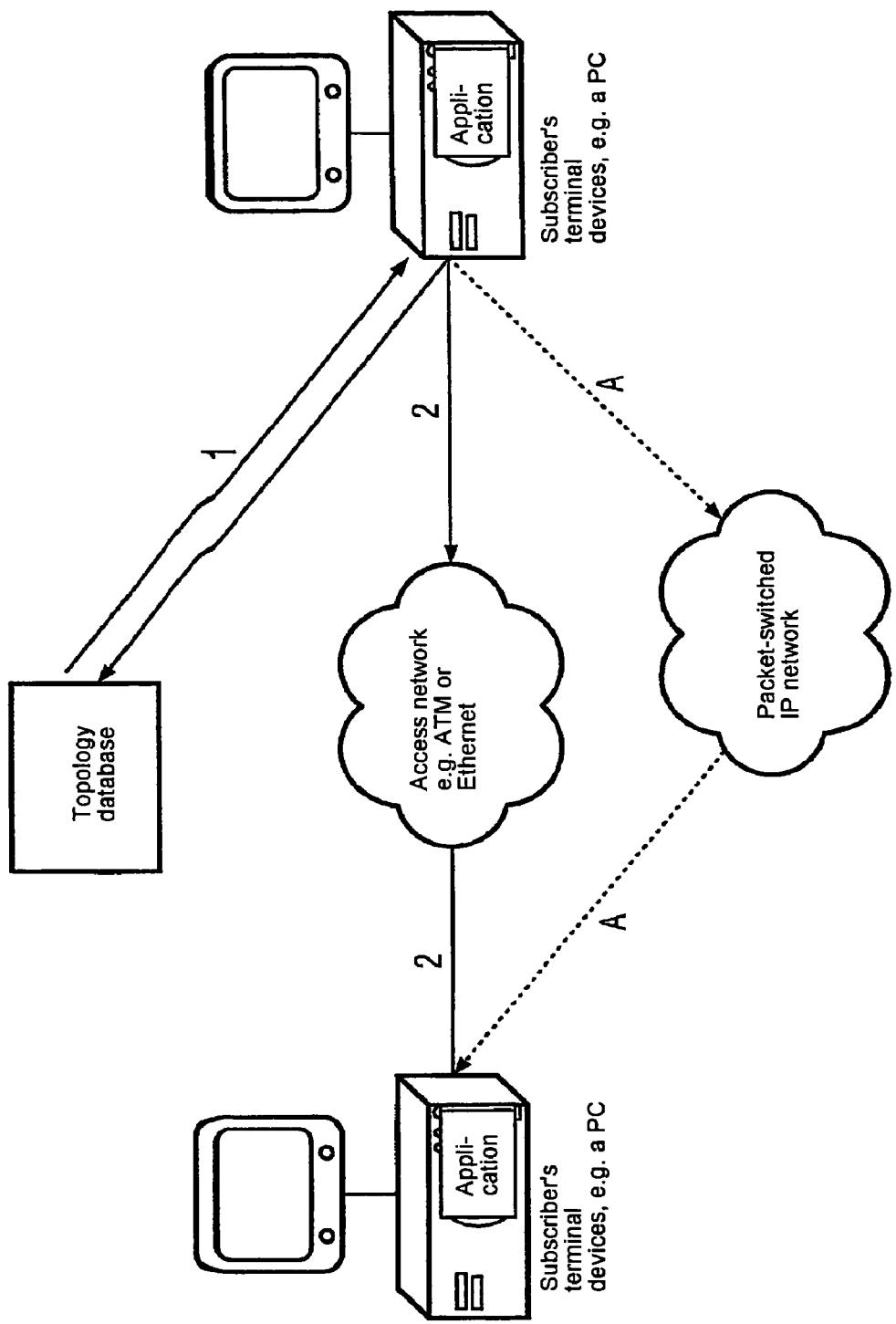

INDIVIDUAL SENDING OF MESSAGES TO PACKET NETWORK SUBSCRIBERS

CROSS REFERENCE TO RELATED APPLICATIONS

This application is the US National Stage of International Application No. PCT/EP2005/051486 filed Apr. 1, 2005 and claims the benefit thereof. The International Application claims the benefits of European application No. 04008884.1 EP filed Apr. 14, 2004, both of the applications are incorporated by reference herein in their entirety.

FIELD OF INVENTION

The present invention relates to sending of messages to packet network subscribers.

SUMMARY OF INVENTION

Until now it has been impossible to send a message (e.g. an SMS, an SIP INVITE, a message from an emergency center or a message which initiates from the subscriber end the establishment of a PPPoE session) to a subscriber of a packet-switched network (e.g. an IP network or ATM network) who does not have a currently valid packet-switched network address (e.g. an IP address). The subscriber can only have the message delivered if the subscriber has actively registered with the network and has been given a packet-switched network address which is known to the central network elements (e.g. a Broadband Radius Access Server—BRAS, which has an assignment between the subscriber and a packet-switched network address, e.g. an IP address). If this is not the case, the message cannot be delivered to him via the packet-switched network.

A new instance—called the "topology database" in what follows—is introduced into the packet-switched network, containing a database and a communication interface.

The database referred to stores the following data about the subscriber: for each subscriber there is an entry, in which is specified how he can be reached in accordance with the topology of the packet-switched network, i.e. how messages can be sent to him by reference to a topological path specification. The method here described can also be used, in particular, for the case when the subscriber has not been allocated a currently valid IP address.

Examples of the topological data for each subscriber are:

access network identity, and for ATM-based access networks: ATM PVC (VC/VC), or for Ethernet-based access networks, the MAC address or VLAN ID Other network elements (e.g. a softswitch or a message distribution center) can also query the topological data for each subscriber, via the communication interface mentioned. The items of data received can then be used by the network element making the query or the transmitting subscriber, as applicable, to transmit the message to the subscriber in the manner specified.

Present-day networks have a Layer 3 part, in which the IP address is valid, and a Layer 2 part (e.g. ATM or Ethernet) in which there is a Layer 2 address (e.g. an ATM address or Ethernet address). The essential point is that when the IP address is issued, a linkage between Layer 2 and Layer 3 is established at the same time. Nowadays, the corresponding entry is made in the BRAS when the IP address is issued—the BRAS is the boundary between the Layer 3 network and the Layer 2 network. The Layer 2 network is also referred to as an Access Network.

Until now, there are no known solutions which are alternatives to the invention with comparable functional scope. One possibility which would exist as an alternative is to give the subscriber a fixed IP address. However, this would mean that the subscriber is always online, and valuable dynamic resources would have to be reserved (BRAS and IP addresses) in the network.

to wait before making the delivery until a time when the subscriber has logged into the network again, and thus has been given an IP address. However, in this case it would be impossible to satisfy an important requirement, namely delivery to the subscriber in real time.

Messages can be transmitted to a subscriber immediately in real time—regardless of whether he has an IP address. This is particularly important in the case of voice or video telephony, if the subscriber who is being called has not registered within the network;

for short messages, because these will be delivered immediately, as is nowadays usual in mobile communication networks;

in emergency situations, when subscribers must be informed quickly and reliably

The fundamental advantage consists in the fact that, with the topology database described, subscribers can be reached at any time, even in packet-switched networks. In circuit-switched networks this is nowadays already the standard situation for analog or ISDN subscribers, e.g. using the ringing current, but as currently implemented in packet-switched networks is not possible.

BRIEF DESCRIPTION OF THE DRAWINGS

FIG. 1 shows a first exemplary embodiment of the present invention; and

FIG. 2 shows a second exemplary embodiment of the present invention.

DETAILED DESCRIPTION OF INVENTION

FIG. 1 shows a first exemplary embodiment, which is explained in more detail below.

A central control server in the network receives a message for a subscriber, to whom it is to be forwarded. Examples of a control server which should be mentioned here are an MMS/SMS distribution center, Instant Messaging Center, Multimedia Soft-switch or an emergency center. At this point, the control server submits a query to the topology database as to how, according to the prevailing topology, the subscriber can be reached (1). The topology database replies with a method, for example with an access network ID and the number of an ATM PVC, which terminates at the subscriber (in the case of Ethernet, the reply is an access network ID and the MAC address). The control server then sends the message to the access network concerned.

To be more precise, the control server itself generates a message which it addresses to a gateway of the access network, and which contains, apart from the content of the message intended for the subscriber, the ATM PVC number (2).

In the access network, the message generated by the control server is now transmitted in accordance with the routing mechanisms available there, and making use of the ATM PVC number, to the subscriber, or more accurately stated to the subscriber's terminal device (3). In the subscriber's terminal device it is forwarded to a suitable application, which can process the message and reply to it if appropriate.

In a variant of this first exemplary embodiment, before it submits the query mentioned to the topology database mentioned the control server checks whether the subscriber currently has a valid IP address. Only if the result of this check is that the subscriber does not currently have a valid IP address and direct onward transmission of the message over the IP network, i.e. by end-to-end communication, is not possible (i.e. the dashed path "A" over the IP network cannot be used), does the control server then continue under this variant with the query to the topology database as mentioned and the delivery mentioned.

FIG. 2 shows a second exemplary embodiment of the invention, which is explained in more detail below.

In this case, a subscriber (the transmitting subscriber) wishes to send a message directly to another subscriber (the receiving subscriber) (peer to peer communication). For this purpose, the transmitting subscriber refers to the topology database (1) and from it receives a description of the method by which the subscriber can be reached. The subscriber follows the description and transmits the message to the access network (2), and from there the message is transmitted, e.g. via the ATM PVC, to the receiving subscriber.

In a variant of this second exemplary embodiment, before submitting the query mentioned to the topology database mentioned the transmitting subscriber checks whether the subscriber currently has a valid IP address.

Only if the result of the check mentioned is that the receiving subscriber does not currently have a valid IP address (and thus the direct path, i.e. end-to-end communication, over the IP network—Path A—is not possible) does the transmitting subscriber proceed in accordance with the method mentioned above, i.e. using the assistance of the topology database mentioned.

The invention claimed is:

1. A method in a packet-switched network for accessing a first subscriber, comprising:
   receiving by a control server a message intended for the first subscriber of the packet-switched network, the first subscriber not assigned with a network address;
   inquiring by the control server an external topology database for information of how to reach the first subscriber according to the topology of the packet-switched network;
   receiving by the control server a reply having a topological path description in response to the inquiry; and
   transmitting by the control server the message to the first subscriber in accordance with the received topological path.

2. The method according to claim 1, wherein the control server is selected from the group consisting of a MMS/SMS distribution center, an Instant Messaging Center, a Multimedia Softswitch, a Voice Softswitch, and an emergency center.

3. The method according to claim 2, wherein the message is selected from the group consisting of an SMS, an MMS, an SIP INVITE, and a message from a second subscriber initiating a PPPoE session.

4. The method according to claim 2, wherein the topological path description includes an access network identity and a second value selected from the group consisting of an ATM PVC, a MAC address, and a VLAN identity.

5. A method in a packet-switched network for accessing a first subscriber, comprising:
   by a control server:
      receiving a message intended for a first subscriber of the packet-switched network;
      checking for a packet-switched network address of the first subscriber;
      when the packet-switched network address is not assigned to the first subscriber:
         inquiring an external topology database for information of how to reach the first subscriber according to the topology of the packet-switched network;
         receiving a reply having a topological path description in response to the inquiry; and
         transmitting the message to the first subscriber in accordance with the received topological path.

6. The method according to claim 5, further comprises:
   when the packet-switched network address is assigned to the first subscriber:
      delivering, by the control server, the message to the first subscriber using the packet-switched network address.

7. The method according to claim 6, wherein the control server is selected from the group consisting of a MMS/SMS distribution center, an Instant Messaging Center, a Multimedia Softswitch, a Voice Softswitch, and an emergency center.

8. The method according to claim 6, wherein the message is selected from the group consisting of an SMS, an MMS, an SIP INVITE, and a message from a second subscriber initiating a PPPoE session.

9. The method according to claim 6, wherein the topological path description includes an access network identity and a second value selected from the group consisting of an ATM PVC, a MAC address, and a VLAN identity.

10. The method in accordance with claim 6,
    wherein the packet-switched network is the Internet, and
    wherein the packet-switched network address of the first subscriber is an IP address.

* * * * *